United States Patent
Ikezawa et al.

(10) Patent No.: US 12,509,077 B2
(45) Date of Patent: Dec. 30, 2025

(54) DRIVING SUPPORT DEVICE

(71) Applicant: TOYOTA JIDOSHA KABUSHIKI KAISHA, Toyota (JP)

(72) Inventors: Yuta Ikezawa, Toyota (JP); Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 18/333,171

(22) Filed: Jun. 12, 2023

(65) Prior Publication Data
US 2024/0017723 A1 Jan. 18, 2024

(30) Foreign Application Priority Data
Jul. 14, 2022 (JP) .................................. 2022-113077

(51) Int. Cl.
*B60W 30/14* (2006.01)
*B60W 30/18* (2012.01)
(Continued)

(52) U.S. Cl.
CPC .... *B60W 30/146* (2013.01); *B60W 30/18154* (2013.01); *B60W 40/105* (2013.01);
(Continued)

(58) Field of Classification Search
CPC ......... B60W 30/146; B60W 30/18154; B60W 40/105; B60W 60/0015; B60W 2520/06;
(Continued)

(56) References Cited

U.S. PATENT DOCUMENTS 6,370,471 B1 * 4/2002 Lohner ................ G05D 1/0257
73/178 R
8,355,851 B2 1/2013 Inoue et al.
(Continued)

FOREIGN PATENT DOCUMENTS

JP 2020-4333 A 1/2020

*Primary Examiner* — Fadey S. Jabr
*Assistant Examiner* — Faris Asim Shaikh
(74) *Attorney, Agent, or Firm* — Sughrue Mion, PLLC

(57) ABSTRACT

Provided is a driving support device (1) including a control device configured to enter, in a first situation that is a situation in which an own vehicle travels in a predetermined region (X) before an intersection and an adjacent traveling lane is absent on a first direction side in a crossing direction of a traveling lane (L0) on which the own vehicle is traveling, a state in which start of driving support for changing a traveling direction of the own vehicle to the first direction at the intersection is possible, and enter, in a second situation that is a situation in which the own vehicle travels in the predetermined region (X) and an adjacent traveling lane is present on the first direction side in the crossing direction of the traveling lane (L0), a state in which the start of the driving support is impossible. When transition to the second situation occurs without execution of a lane change after the control device enters the state in which the start of the driving support is possible in the first situation, the control device holds the state in which the start of the driving support is possible until a second time point that is one of: a time point when a predetermined time has elapsed from a first time point that is a time point when the transition to the second situation occurs; or a time point when the own vehicle has traveled over a predetermined distance from the first time point.

5 Claims, 6 Drawing Sheets

(51) Int. Cl.
*B60W 40/105* (2012.01)
*B60W 60/00* (2020.01)

(52) U.S. Cl.
CPC ..... *B60W 60/0015* (2020.02); *B60W 2520/06* (2013.01); *B60W 2552/53* (2020.02)

(58) Field of Classification Search
CPC ..... B60W 2552/53; B60W 2050/0095; B60W 2720/106; B60W 30/12; B60W 30/14; B60W 30/16; B60W 30/143; B60W 30/10; B60W 30/06; B60W 30/02; B60W 10/20; B60W 2554/801; B60W 2554/802; B60W 30/09; B60W 2520/10; B60W 2754/30; B60W 2754/20; B60W 2050/143; B60W 2050/0073; B60W 2040/0818; B60W 2552/10; B60W 2552/05; B60W 30/095; B60W 40/08; B60W 2050/0072; B60W 30/18163; B60W 30/18159; B60W 60/0054; B60W 60/0053; B60W 60/005; B60W 60/0057; B60W 60/007; B60W 2050/146; B60W 50/16; B60W 50/14; B60W 40/09; B60W 2554/60; B60W 2540/10; B60W 2540/12
See application file for complete search history.

(56) References Cited

U.S. PATENT DOCUMENTS

| | | | |
|---|---|---|---|
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 11,613,263 B2 * | 3/2023 | Hasegawa | B60W 10/18 701/29.2 |
| 2005/0150701 A1 * | 7/2005 | Michi | B60W 30/17 180/170 |
| 2006/0241844 A1 * | 10/2006 | Mori | B60W 40/105 701/93 |
| 2011/0246043 A1 * | 10/2011 | Maruyama | G08G 1/166 701/96 |
| 2012/0035825 A1 * | 2/2012 | Morita | B60W 10/18 701/70 |
| 2018/0009440 A1 * | 1/2018 | Kozuka | B60W 30/18109 |
| 2019/0163176 A1 * | 5/2019 | Wang | G05D 1/0088 |
| 2019/0278285 A1 * | 9/2019 | Umeda | B60W 30/18154 |
| 2019/0295419 A1 | 9/2019 | Tosa et al. | |
| 2019/0308634 A1 * | 10/2019 | Dakemoto | B60S 1/46 |
| 2020/0001875 A1 | 1/2020 | Kato et al. | |
| 2020/0047772 A1 * | 2/2020 | Yasue | B60W 30/16 |
| 2020/0180622 A1 * | 6/2020 | Hosokawa | B60W 30/18145 |
| 2020/0198648 A1 * | 6/2020 | Ishioka | G05D 1/0088 |
| 2020/0216070 A1 * | 7/2020 | Okamoto | B60W 50/14 |
| 2020/0298890 A1 * | 9/2020 | Miyagawa | B60W 60/00272 |
| 2022/0135129 A1 * | 5/2022 | Oniwa | B62D 15/025 701/41 |

\* cited by examiner

DRIVING SUPPORT DEVICE

BACKGROUND OF THE INVENTION

1. Field of the Invention

The present invention relates to a driving support device which supports a driving operation for turning right or turning left at an intersection.

2. Description of the Related Art

There has been known a driving support device (hereinafter referred to as "related-art device") which is mounted to an own vehicle, and supports a driving operation for turning right or turning left at an intersection (see Japanese Patent Application Laid-open No. 2020-4333). When an adjacent traveling lane is absent on a side of a first direction which is a direction indicated by a direction indicator mounted to the own vehicle, the related-art device estimates that "a driver is changing a travel direction to the first direction at the intersection." In this case, the related-art device can support the driving operation for changing the traveling direction (turning right or turning left) at this intersection. For example, when the own vehicle is traveling at a relatively high speed, the related-art device controls a braking device, to thereby decelerate the own vehicle.

Incidentally, for example, as illustrated in FIG. 6, there is a case in which a traveling lane dedicated to the right turn is provided before an intersection. In this example, an adjacent traveling lane is absent on the first direction side (right side) in a situation A (part (A) of FIG. 6) in which the direction indicator on the right side is activated on a single traveling lane before the lane dedicated to the right turn, and hence the related-art device can execute the driving support for the right turn. A traveling lane (lane dedicated to the right turn) adjacent is present in the first direction side (right side) in a situation B (part (B) of FIG. 6) in which the own vehicle reaches the left side of the lane dedicated to the right turn after the own vehicle has traveled without changing the lane, and hence the related-art device cannot execute the driving support for the right turn in principle. Thus, when the situation A transitions to the situation B afterward (when a timing to enter the lane dedicated to the right turn is slightly delayed), the driving support is not executed, and hence there is a fear that safety of the travel in the intersection may decrease. The same problem as the above-mentioned problem in the driving support for the right turn possibly occurs in the driving support for the left turn as well.

SUMMARY OF THE INVENTION

One object of the present invention is to provide a driving support device which supports a driving operation for turning right or turning left at an intersection, and with which safety can be increased.

In order to solve the above-mentioned problem, according to at least one embodiment of the present invention, there is provided a driving support device (1) including a control device (10) configured to: enter, in a first situation (SR1, SL1) that is a situation in which an own vehicle (V) travels in a predetermined region (X) before an intersection and an adjacent traveling lane is absent on a side of a first direction in a crossing direction of a traveling lane (L0) on which the own vehicle is traveling, a state in which start of driving support for changing a traveling direction of the own vehicle to the first direction at the intersection is possible; and enter, in a second situation (SR2, SL2) that is a situation in which the own vehicle travels in the predetermined region and an adjacent traveling lane is present on the side of the first direction in the crossing direction of the traveling lane on which the own vehicle is traveling, a state in which the start of the driving support is impossible. When transition to the second situation occurs without execution of a lane change after the control device enters the state in which the start of the driving support is possible in the first situation, the control device is configured to hold the state (FR=1, FL=1) in which the start of the driving support is possible until a second time point (t2) that is one of: a time point when a predetermined time (Tth) has elapsed from a first time point (t1) that is a time point when the transition to the second situation occurs; or a time point when the own vehicle has traveled over a predetermined distance from the first time point (t1).

When the first situation transitions to the second situation without execution of a lane change (for example, when a timing to enter a lane dedicated to the right turn is slightly delayed), a driver then possibly causes the own vehicle to travel toward the first direction at the intersection. Thus, the control device holds the state in which the driving support can be started from the first time point until the second time point. For example, even when the own vehicle is traveling at a relatively high speed, and hence the timing to enter the lane dedicated to the right turn is slightly delayed, the deceleration control is started by the driving support device executing the driving support such that the right turn can safely be made. Thus, according to the at least one embodiment of the present invention, the safety of the travel in the intersection can be increased compared with a device which causes the driving support to immediately transition to the state in which the driving support cannot be started at the first time point.

In the driving support device according to one aspect of the present invention, when a distance between the own vehicle and the intersection is equal to or shorter than a threshold value at the second time point, the control device is configured to hold the state in which the start of the driving support is possible until one of: a third time point that is one of a time point when a predetermined time has elapsed from the second time point or a time point when the own vehicle has traveled over a predetermined distance from the second time point; or a fourth time point that is a time point when the own vehicle passes the intersection from the second time point.

With the driving support device according to this aspect, when the own vehicle is positioned immediately before the intersection at the second time point, the state in which the driving support can be started is further held. As a result, the safety of the travel in the intersection can further be increased.

In the driving support device according to one aspect of the present invention, the control device is configured to hold the state in which the start of the driving support is possible regardless of whether the adjacent traveling lane is absent or present in a situation in which the traveling lane on which the own vehicle is traveling is a dedicated lane that permits travel toward only a specified direction including the first direction.

When the traveling lane on which the own vehicle is traveling is the dedicated lane for traveling toward the first direction, the driver highly possibly changes the traveling direction at the intersection. Thus, in this case, regardless of whether the adjacent traveling lane is absent or present, the control device holds the state in which the driving support can be started. As a result, the safety of the travel in the intersection can further be increased.

Further, in the driving support device according to one aspect of the present invention, the control device is configured to start the driving support when a direction indicator of the own vehicle indicates the first direction under the state in which the start of the driving support is possible.

With this configuration, it is possible to support the driving operation for changing the traveling direction of the own vehicle to the first direction at the intersection.

Further, in the driving support device according to another aspect of the present invention, the driving support includes deceleration support of decelerating the own vehicle, and the control device is configured to start the deceleration support when a speed (vs) of the own vehicle is higher than a predetermined target value (vsth).

With this configuration, the speed of the own vehicle can be adjusted such that the own vehicle can safely turn right or turn left at the intersection.

When a driver requests the driving support by the related-art device at the time of the transition from the first situation to the second situation in the related-art device, this driver is required to execute a predetermined operation (for example, to press a switch of a push button type). Thus, the above-mentioned operating element is provided in the related-art device, and hence a component cost of the related-art device is high. Moreover, this operation is complicated. In contrast, according to the at least one embodiment of the present invention, the state in which the driving support can be started is held from the first time point until the predetermined time point. That is, it is not required to provide the above-mentioned operating element, and hence the component cost of the driving support device can be reduced. Moreover, the above-mentioned complicated operation is not required.

DESCRIPTION OF THE EMBODIMENTS (Outline)

Figure 1:
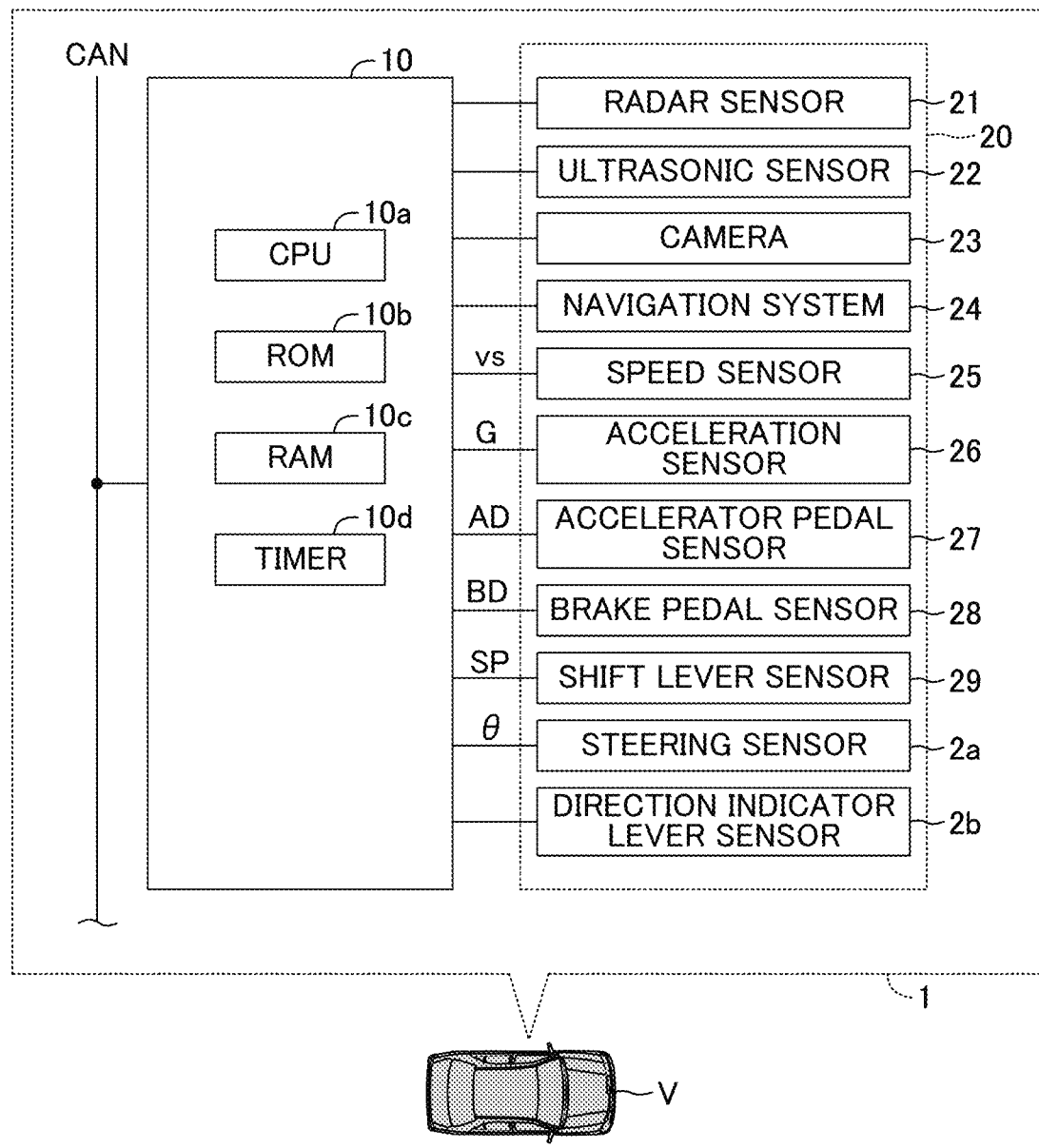
FIG. 1 is a block diagram of a driving support device according to at least one embodiment of the present invention.

As illustrated in FIG. 1, a driving support device 1 according to at least one embodiment of the present invention is mounted to a vehicle V (hereinafter referred to as "own vehicle") having a self-driving function. The driving support device 1 has a function of controlling a drive device, a braking device, a steering device, an information presentation device, and the like (hereinafter referred to as "drive device and the like") of the own vehicle in a predetermined region before an intersection, to thereby support a driving operation for turning right or turning left by a driver.

(Specific Configuration)

As illustrated in FIG. 1, the driving support device 1 includes a driving support ECU 10 and in-vehicle sensors 20.

The driving support ECU 10 includes a microcomputer including, for example, a CPU 10a, a ROM 10b, a RAM 10c, and a timer 10d.

The driving support ECU 10 is connected to other ECUs (for example, ECU of braking device) via a controller area network (CAN).

The in-vehicle sensors 20 include sensors which acquire information relating to objects present around the own vehicle. For example, the in-vehicle sensors 20 include sensors which acquire information relating to, for example, a white line on a road surface, a guardrail, or a traffic light.

Specifically, the in-vehicle sensors 20 include a radar sensor 21, an ultrasonic sensor 22, a camera 23, and a navigation system 24.

The radar sensor 21 includes a transmitting/receiving unit and a signal processing unit (which are not shown). The transmitting/receiving unit radiates radio waves in the millimeter wave band (hereinafter referred to as "millimeter waves") into an area around the own vehicle, and receives the millimeter waves (reflected waves) reflected by a three-dimensional object present within a radiation range. The signal processing unit calculates, for example, a distance between the own vehicle and the three-dimensional object, a relative speed between the own vehicle and the three-dimensional object, and a relative position (direction) of the three-dimensional object with respect to the own vehicle based on, for example, a time from the radiation of the millimeter waves by the transmitting/receiving unit until the reception of the reflected waves by the transmitting/receiving unit, a phase difference between the transmitted millimeter waves and the received reflected waves, and an attenuation level of the reflected waves, and transmits results of the calculation to the driving support ECU 10.

The ultrasonic sensor 22 intermittently radiates ultrasonic waves to an area around the own vehicle, and receives ultrasonic waves (reflected waves) reflected by a three-dimensional object. The ultrasonic sensor 22 calculates a relative speed between the own vehicle and the three-dimensional object, a relative position (direction) of the three-dimensional object with respect to the own vehicle, and the like based on a time from the transmission of the ultrasonic waves until the reception of the reflected waves, and transmits results of the calculation to the driving support ECU 10.

The camera 23 includes an image pickup device and an image analysis device. The image pickup device is, for example, a digital camera having a built-in image pickup element being a charge-coupled device (CCD) or a CMOS image sensor (CIS). The image pickup device is mounted on an upper part of a front windshield glass. The image pickup device acquires image data by photographing the foreground of the own vehicle at a predetermined frame rate. The image pickup device transmits the image data to the image analysis device. The image analysis device analyzes the obtained image data to acquire information relating to a target positioned in front of the own vehicle from the image. The image analysis device also recognizes, for example, separation lines, stop lines, or a pedestrian crossing drawn on a road surface, or a traffic light installed at an intersection and transmits results of the recognition to the driving support ECU 10.

The navigation system 24 detects a current position (latitude and longitude) of the own vehicle based on GPS signals received from a plurality of artificial satellites. Further, the navigation system 24 stores map data (road information) representing a map. The navigation system 24 transmits data representing a position of the own vehicle on the map to the driving support ECU 10.

The in-vehicle sensors 20 further include sensors which acquire information relating to a travel state (speed and acceleration) of the own vehicle and information relating to an operating mode of an operating element provided in the own vehicle.

Specifically, the in-vehicle sensors 20 include a speed sensor 25, an acceleration sensor 26, an accelerator pedal sensor 27, a brake pedal sensor 28, a shift lever sensor 29, a steering sensor 2a, and a direction indicator lever sensor 2b.

The speed sensor 25 detects a rotation speed (wheel speed) of each wheel, to thereby calculate a speed vs (actual vehicle speed) of the own vehicle based on the wheel speed of each wheel. The speed sensor 25 transmits data representing the speed vs to the driving support ECU 10.

The acceleration sensor 26 detects an acceleration G of the vehicle V (for example, an acceleration in a vehicle width direction of the own vehicle and an acceleration in a longitudinal direction thereof). The acceleration sensor 26 transmits data representing the acceleration G to the driving support ECU 10.

The accelerator pedal sensor 27 detects a depression depth AD of an accelerator pedal (not shown) of the own vehicle. The accelerator pedal sensor 27 transmits data representing the depression depth AD of the accelerator pedal to the driving support ECU 10.

The brake pedal sensor 28 detects a depression depth BD of a brake pedal (not shown) of the own vehicle. The brake pedal sensor 28 transmits data representing the depression depth BD to the driving support ECU 10.

The shift lever sensor 29 detects a position (shift lever position SP) of a shift lever (not shown) of the own vehicle. The shift lever sensor 29 transmits data representing the shift lever position SP to the driving support ECU 10.

The steering sensor 2a detects a steering angle (also referred to as "turning angle" or "steered angle") $\theta$ of a steering wheel of the own vehicle. The steering sensor 2a transmits data representing the detected steering angle $\theta$ to the driving support ECU 10.

The direction indication lever sensor 2b includes switch devices (hereinafter referred to as "right turn switch" and "left turn switch") built into the direction indicator. When a lever of the direction indicator is at a neutral position, the left turn switch and the right turn switch are in an OFF state. When the driver causes the own vehicle to travel to the right direction, the driver pulls down this lever from the neutral position to a predetermined direction. As a result, the right turn switch is brought into an ON state. In this case, the left turn switch remains in the OFF state. Meanwhile, when the driver causes the own vehicle to travel to the left direction, the driver turns down this lever from the neutral position to an opposite direction of the above-mentioned predetermined direction. As a result, the left turn switch is brought into the ON state. In this case, the right turn switch remains in the OFF state. The driving support ECU 10 monitors the ON state and the OFF state of each of the right turn switch and the left turn switch.

(Operation)

The driving support ECU 10 has a function of executing right turn support control and left turn support control which support a driving operation of turning the own vehicle right at an intersection and a driving operation of turning the own vehicle left at an intersection, respectively, as described below. The right turn support control and the left turn support control include braking control for decelerating the own vehicle (adjusting the speed vs). The driving support ECU 10 may execute steering control of supporting the steering, warning control of presenting predetermined warning, or the like as the right turn support control and the left turn support control.

<Right Turn Support Control>

The driving support ECU 10 sequentially determines whether or not the own vehicle is traveling in a predetermined region X before an intersection (a region having a distance to a center of the intersection equal to or shorter than a threshold value) based on information (hereinafter referred to as "peripheral information") acquired from the radar sensor 21, the camera 23, the navigation system 24, and the like.

When the driving support ECU 10 determines that the own vehicle is traveling in the region X, the driving support ECU 10 determines whether or not a traveling lane adjacent to a traveling lane L0 on which the own vehicle is traveling is present based on the peripheral information. After that, the driving support ECU 10 sets a value of a flag FR in accordance with whether an adjacent traveling lane is absent or present on the right side of the traveling lane L0. The flag FR represents "whether or not the driving support ECU 10 can start the braking control for the right turn." When the flag FR is "1", the driving support ECU 10 can start the braking control for the right turn. When the flag FR is "0", the driving support ECU 10 cannot start the braking control for the right turn.

When the driving support ECU 10 determines that an adjacent traveling lane is absent on the right side of the traveling lane L0, the driving support ECU 10 sets the flag FR to "1". Meanwhile, when the driving support ECU 10 determines that an adjacent traveling lane is present on the right side of the traveling lane L0, the driving support ECU 10 sets the flag FR to "0".

Figure 2:
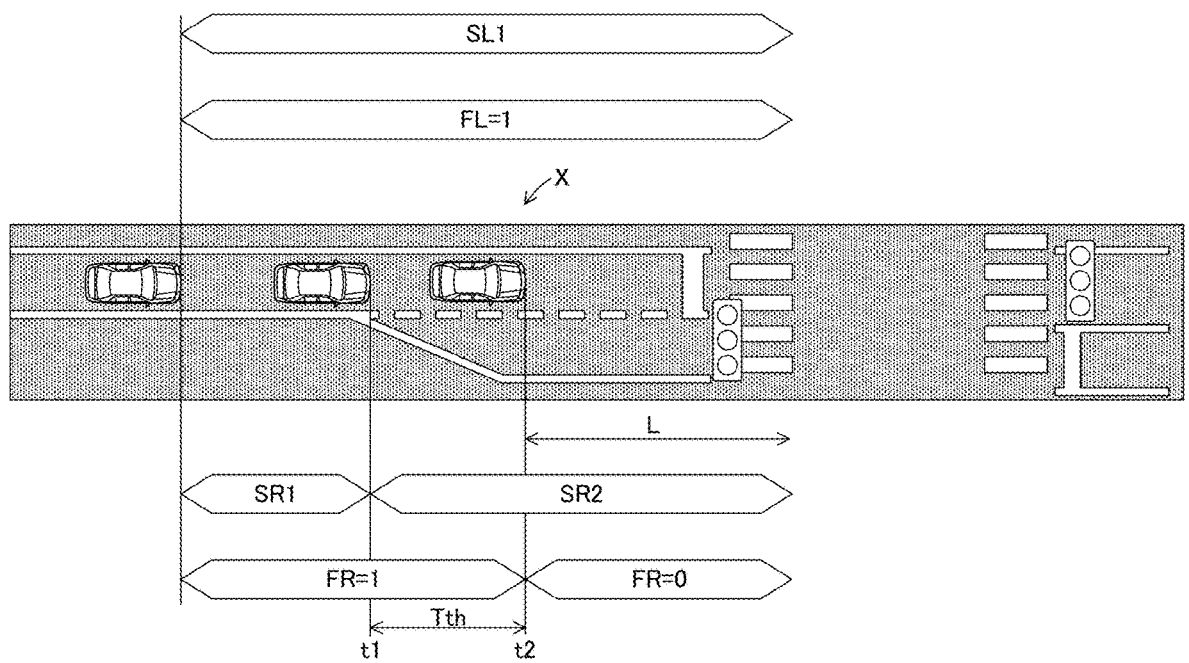
FIG. 2 is a plan view for illustrating an example in which an own vehicle travels straight from a position before an intersection.
Figure 3:
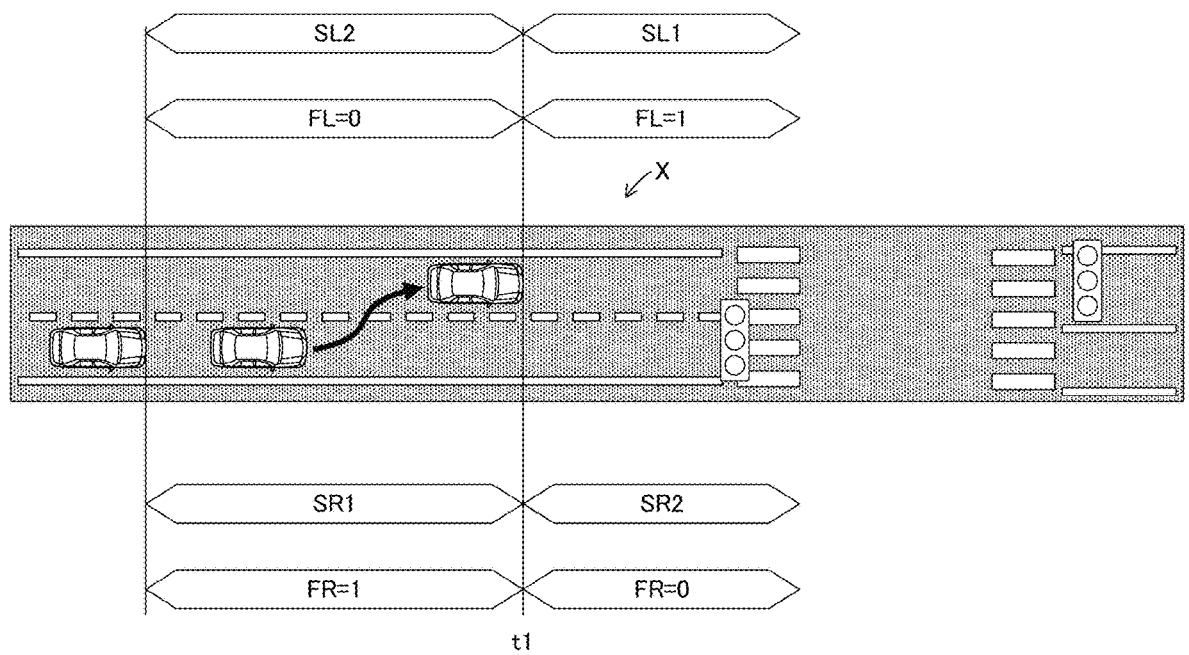
FIG. 3 is a plan view for illustrating an example in which the own vehicle has changed a lane before an intersection.

Incidentally, as illustrated in FIG. 2 and FIG. 3, there is a case in which, in a process of the travel of the own vehicle in the region X, a situation SR1 in which an adjacent traveling lane is absent on the right side of the traveling lane L0 transitions to a situation SR2 in which an adjacent traveling lane is present on the right side of the traveling lane L0.

In an example illustrated in FIG. 2, the own vehicle is traveling on the same lane in the situation SR1 and the situation SR2. That is, a lane change is not executed in the process of the transition from the situation SR1 to the situation SR2. In the situation SR1 in this example, the driving support ECU 10 sets the flag FR to "1". After that, the driving support ECU 10 holds the flag FR at "1" until a time point t2 when an elapsed time T from a time point t1 when the situation SR1 transitions to the situation SR2 (a boundary between the situation SR1 and the situation SR2) reaches a threshold value Tth. After that, the driving support ECU 10 causes the flag FR to transition to "0" at the time point t2.

Meanwhile, in the example illustrated in FIG. 3, the situation SR1 transitions to the situation SR2 as a result of a lane change of the own vehicle to a traveling lane on the left side. In the situation SR1 in this example, the driving support ECU 10 sets the flag FR to "1". After that, the driving support ECU 10 immediately causes the flag FR to transition to "0" at the time point t1 when the situation SR1 transitions to the situation SR2 (time point when the lane change is completed). The driving support ECU 10 determines whether or not the own vehicle has executed the lane change based on the peripheral information. For example, the driving support ECU 10 determines whether or not the own vehicle has crossed a white line based on a recognition result relating to a position of the white line acquired from the camera 23, the acceleration G acquired from the acceleration sensor 26, or the like. When the driving support ECU 10 determines that the own vehicle has crossed the white line, the driving support ECU 10 determines that the own vehicle has executed the lane change. When the driving support ECU 10 determines that the own vehicle has not crossed the white line, the driving support ECU 10 determines that the own vehicle has not executed the lane change.

As described above, when the situation of the traveling lane on the right side of the traveling lane L0 transitions from the situation SR1 to the situation SR2 while the lane change is not executed, the driving support ECU 10 holds the state in which the braking control for the right turn can be started until a certain time elapses from the time point t1. Meanwhile, when the situation SR1 transitions to the situation SR2 as a result of a lane change, the driving support ECU 10 causes, at the time point t1, the state in which the braking control for the right turn can be started to transition to the state in which the braking control for the right turn cannot be started. The examples of FIG. 2 and FIG. 3 are examples in which the situation SR1 transitions to the situation SR2. Conversely, when the situation SR2 transitions to the situation SR1, the driving support ECU 10 immediately sets the flag FR to "1" at this time point.

When the following conditions A1 and A2 are satisfied in the region X, the driving support ECU 10 starts the braking control for the right turn. That is, the driving support ECU 10 predicts the speed vs at a time point of entry into the intersection based on the depression depth AD of the accelerator pedal, the depression depth BD of the brake pedal, and the like. Moreover, the driving support ECU 10 controls the braking device of the own vehicle so that a predicted value evs of the speed vs is equal to or lower than a predetermined target value vsth.

(A1) The flag FR is "1".
(A2) The right turn switch is in the ON state (the direction indicator indicates the right turn).

The driving support ECU 10 continues the braking control until the own vehicle passes the intersection even when one or both of the condition A1 and the condition A2 are unsatisfied during the execution of the braking control for the right turn. However, when the driver executes a predetermined operation (for example, when the driver deeply depresses the accelerator pedal), the driving support ECU 10 finishes the execution of the braking control.

Figure 4:
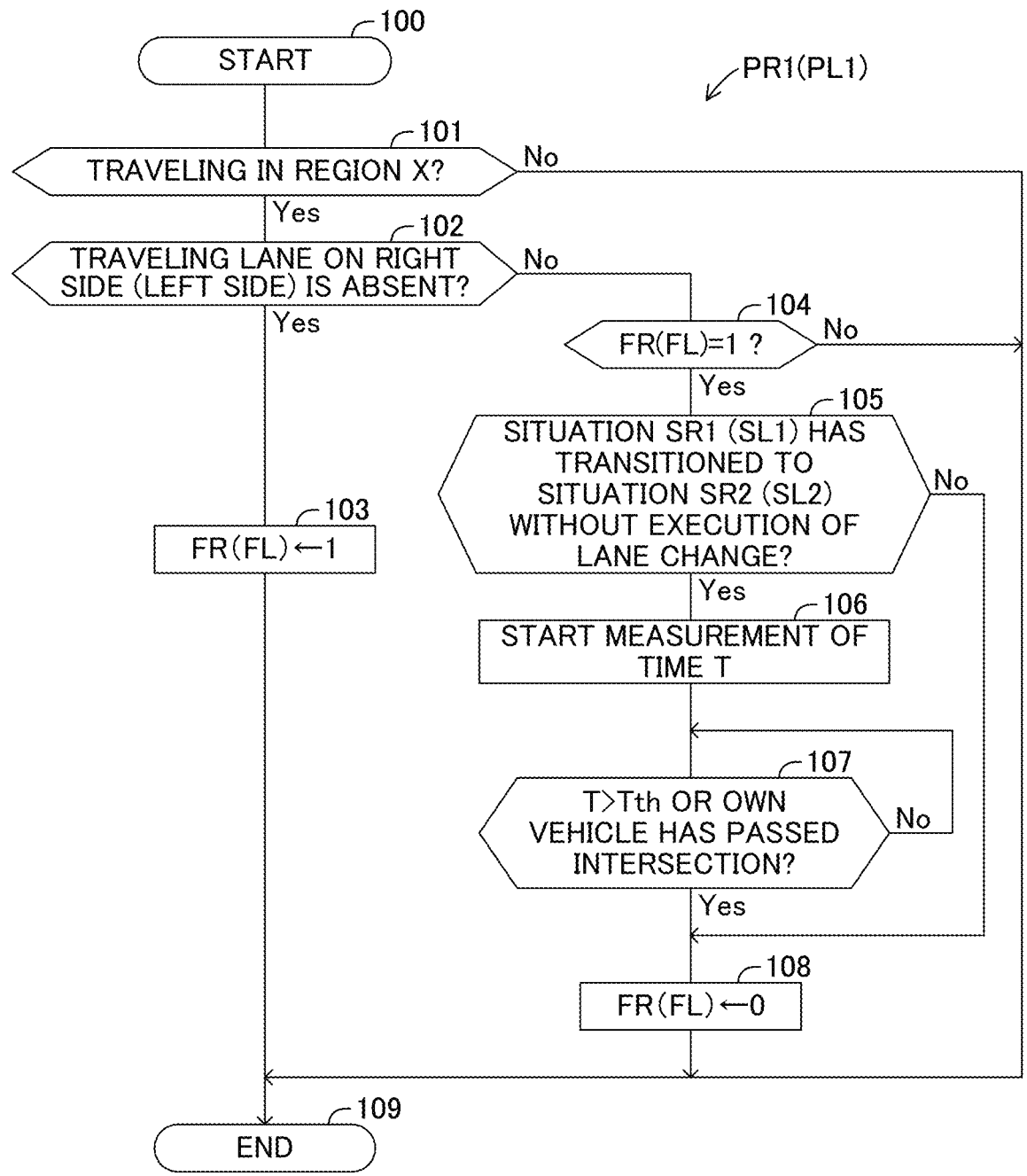
FIG. 4 is a flowchart of a program for setting a flag.
Figure 5:
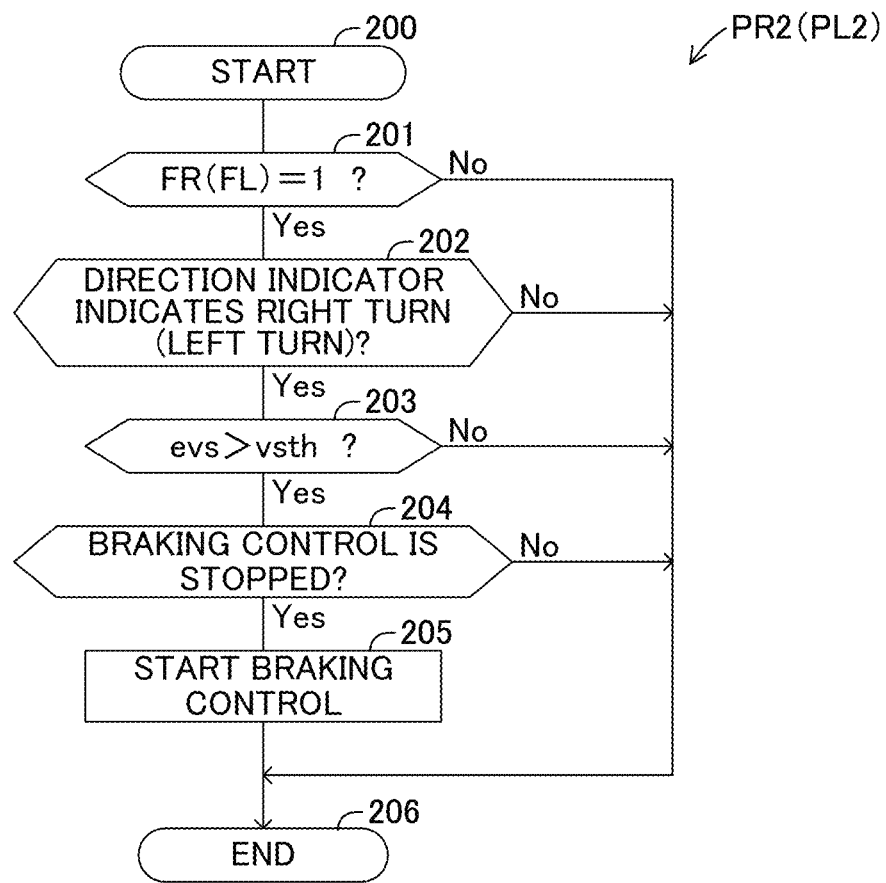
FIG. 5 is a flowchart of a program for starting braking control.
Figure 6:
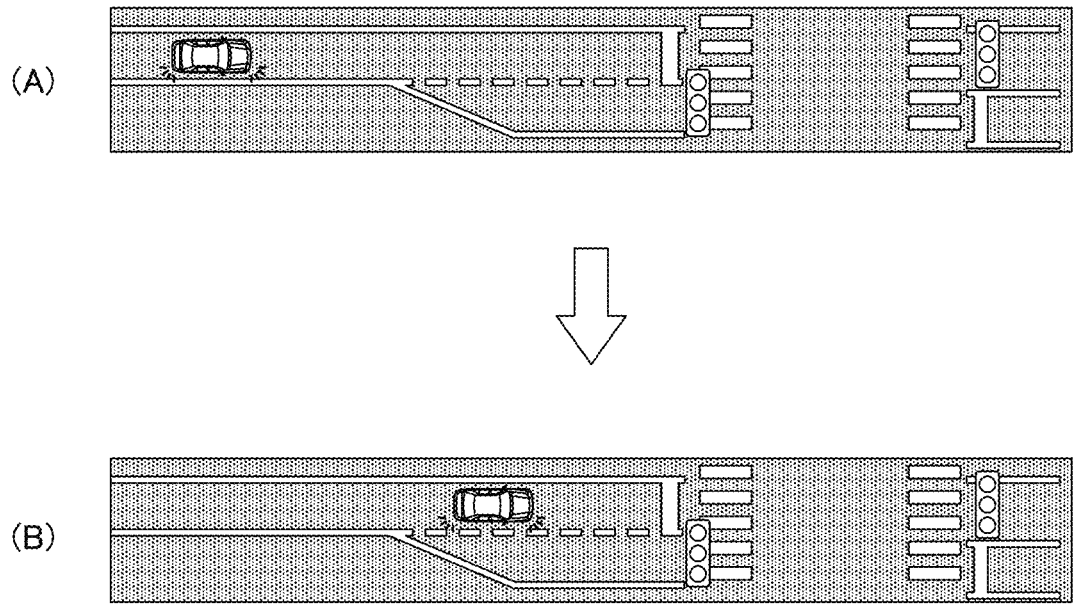
FIG. 6 is a plan view for illustrating a scene of transition of a state (A) in which a related-art device can provide driving support to a state (B) in which the related-art device cannot provide the driving support.

With reference to FIG. 4 and FIG. 5, a specific description is now given of operations (a program PR1 and a program PR2 which implement the operation of starting the braking control for the right turn) of a CPU 10a (hereinafter simply referred to as "CPU") of the driving support ECU 10. When an ignition switch of the own vehicle is in an ON state, the CPU executes those programs PR1 and PR2 at predetermined cycles.

(Program PR1)

The CPU starts executing the program PR1 from Step 100, and then advances the process to Step 101.

In Step 101, the CPU determines whether or not the own vehicle is traveling the region X. When the own vehicle is traveling in the region X (Yes in Step 101), the CPU advances the process to Step 102. Meanwhile, when the own vehicle is not traveling in the region X (No in Step 101), the CPU advances the process to Step 109, and finishes the execution of the program PR1.

In Step 102, the CPU determines whether or not an adjacent traveling lane is absent on the right side of the traveling lane L0. When an adjacent traveling lane is absent on the right side of the traveling lane L0 (Yes in Step 102), the CPU advances the process to Step 103. Meanwhile, when an adjacent traveling lane is present on the right side of the traveling lane L0 (No in Step 102), the CPU advances the process to Step 104.

In Step 103, the CPU sets the flag FR to "1", and advances the process to Step 109.

When the process is advanced from Step 102 to Step 104, the CPU determines whether or not the flag FR is "1". When the flag FR is "1" (Yes in Step 104), the CPU advances the process to Step 105. Meanwhile, when the flag FR is "0", the CPU advances the process to Step 109.

In Step 105, the CPU determines whether or not the situation SR1 has transitioned to the situation SR2 without the execution of the lane change. When the lane change has not been executed (Yes in Step 105), the CPU advances the process to Step 106. Meanwhile, when the lane change has been executed (No in Step 105), the CPU advances the process to Step 108 described later.

In Step 106, the CPU starts measurement of the elapsed time T, and advances the process to Step 107.

In Step 107, the CPU determines whether or not the elapsed time T is longer than the threshold value Tth. When the elapsed time T is longer than the threshold value Tth (Yes in Step 107), the CPU advances the process to Step 108. Meanwhile, when the elapsed time T is equal to or shorter than the threshold value Tth (No in Step 107), the CPU returns the process to Step 107. Moreover, when the own vehicle has passed the intersection in Step 107, the CPU advances the process to Step 108.

In Step 108, the CPU sets the flag FR to "0", and advances the process to Step 109.

(Program PR2)

The CPU starts executing the program PR2 from Step 200, and then advances the process to Step 201.

In Step 201, the CPU determines whether or not the flag FR is "1". When the flag FR is "1" (Yes in Step 201), the CPU advances the process to Step 202. Meanwhile, when the flag FR is "0" (No in Step 201), the CPU advances the process to Step 206, and finishes the execution of the program PR2.

In Step 202, the CPU determines whether or not the direction indicator indicates the right turn. When the direction indicator indicates the right turn (Yes in Step 202), the CPU advances the process to Step 203. Meanwhile, when the direction indicator does not indicate the right turn (No in Step 202), the CPU advances the process to Step 206, and finishes the execution of the program PR2.

In Step 203, the CPU determines whether or not the predicted value evs of the speed vs is higher than the target value vsth. When the predicted value evs is higher than the target value vsth (Yes in Step 203), the CPU advances the process to Step 204. Meanwhile, when the predicted value evs is equal to or lower than the threshold value vsth (No in Step 203), the CPU advances the process to Step 206.

In Step 204, the CPU determines whether or not the braking control is stopped. When the braking control is stopped (Yes in Step 204), the CPU advances the process to Step 205. Meanwhile, when the braking control is being executed (No in Step 204), the CPU advances the process to Step 206.

In Step 205, the CPU starts the braking control, and advances the process to Step 206.

<Left Turn Support Control>

Description is now given of the left turn support control. A difference between the right turn support control and the left turn support control resides only in that the left-and-right directions thereof are opposite to each other. Thus, this difference is now mainly described, and description of operations common to the right turn support control and the left turn support control is omitted.

The driving support ECU 10 sets a value of a flag FL (flag indicating "whether or not the driving support ECU 10 can start the braking control for the left turn") in accordance with whether an adjacent traveling lane is absent or present on the left side of the traveling lane L0 in the region X.

Moreover, the driving support ECU 10 sets, in the region X, the flag FL by the same method as the method of setting the flag FR. In the example illustrated in FIG. 2, a situation relating to whether a traveling lane on the left side of the traveling lane L0 is absent or present is not changed. That is, in this example, the situation on the left side of the traveling lane L0 remains in a situation SL1, and hence does not change. Thus, in this case, the driving support ECU 10 holds the flag FL at "1". Moreover, in the example illustrated in FIG. 3, a situation on the left side of the traveling lane L0 transitions from a situation SL2 to the situation SL1. In this case, the driving support ECU 10 immediately sets the flag FL to "1" at a time point when the situation SL2 transitions to the situation SL1.

When the following conditions B1 and B2 are satisfied in the region X, the driving support ECU 10 starts the braking control.

(B1) The flag FL is "1".

(B2) The left turn switch is in the ON state (the direction indicator indicates the left turn).

The driving support ECU 10 continues the braking control until the own vehicle passes the intersection even when one or both of the condition B1 and the condition B2 are unsatisfied during the execution of the braking control for the left turn. However, when the driver executes a predetermined operation (for example, when the driver deeply depresses the accelerator pedal), the driving support ECU 10 finishes the execution of the braking control.

(Programs PL1 and PL2)

When the ignition switch is in the ON state, the CPU executes the programs PL1 and PL2 for implementing the operation of starting the above-mentioned braking control for the left turn at predetermined cycles. As illustrated in FIG. 4 and FIG. 5, a difference between the programs PL1 and PL2 and the programs PR1 and PR2 resides only in that the left-and-right directions thereof are opposite to each other. Thus, a detailed description of the programs PL1 and PL2 are omitted.

(Effects)

As described above, when the situation SR1 (SL1) transitions to the situation SR2 (SL2) without the execution of the lane change in the vehicle to which the driving support device 1 according to the at least one embodiment is applied, the state in which the deceleration control (driving support) can be started is held from this time point t1 until the predetermined time elapses. For example, even when the own vehicle is traveling at a relatively high speed, and hence the timing to enter the lane dedicated to the right turn is slightly delayed, the deceleration control is started so that the right turn can safely be made. Thus, according to the at least one embodiment, the safety of the travel in the intersection can be increased compared with a device which causes the state in which the deceleration control can be started to immediately transition to the state in which the deceleration control cannot be started at the time point t1. Moreover, an operating element which is used by the driver to request the deceleration control (driving support) as in the related-art device is not required, and hence a component cost of the driving support device 1 can be reduced. Moreover, such a complicated operation as that performed in the related-art device is not required.

The present invention is not limited to the at least one embodiment described above, and various modification examples can be adopted within the scope of the present invention as described below.

Modification Example 1

When the distance L between the own vehicle and the intersection at the time point t2 is equal to or shorter than a threshold value Lth, the driving support ECU 10 may hold the state in which the deceleration control (driving support) can be started until a time point t3 when a predetermined time has further elapsed from this time point t2. Moreover, the driving support ECU 10 may hold the state in which the deceleration control (driving support) can be started from the time point t2 until the own vehicle passes the intersection.

Modification Example 2

The driving support ECU 10 may recognize, based on the peripheral information (road signs, arrows drawn on a road surface, and the like), whether or not the traveling lane L0 is a dedicated lane permitting the right turn or the left turn (including "a lane permitting the right turn and a straight travel" and "a lane permitting the left turn and the straight travel"). It is preferred that the driving support ECU 10 hold the state (FR=1 (FL=1)) in which the driving support for the right turn (left turn) can be executed regardless of the situation on the right side (left side) of the traveling lane L0 in a situation in which the driving support ECU 10 recognizes that the traveling lane L0 is the lane dedicated to the right turn (lane dedicated to the left turn).

Modification Example 3

The above-mentioned driving support device 1 holds the state in which the deceleration control (driving support) can be started until the predetermined time elapses from the time point t1. In place of this configuration, the driving support device 1 may hold the state in which the deceleration control can be started until the travel distance of the own vehicle reaches a predetermined distance from the time point t1.

What is claimed is:

1. A driving support device, comprising:
a control device including a memory storing a program and a processor that executes the program,
wherein the control device is configured to:
enter, in a first situation that is a situation in which an own vehicle travels in a predetermined region before an intersection and an adjacent traveling lane is absent on a side of a first direction in a crossing direction of a traveling lane on which the own vehicle is traveling, a state in which start of driving support for changing a traveling direction of the own vehicle to the first direction at the intersection is possible;
enter, in a second situation that is a situation in which the own vehicle travels in the predetermined region and an adjacent traveling lane is present on the side of the first direction in the crossing direction of the traveling lane on which the own vehicle is traveling, a state in which the start of the driving support is impossible;

when transition to the second situation occurs without execution of a lane change after the control device enters the state in which the start of the driving support is possible in the first situation, hold the state in which the start of the driving support is possible until a second time point that is one of: a time point when a predetermined time has elapsed from a first time point that is a time point when the transition to the second situation occurs; or a time point when the own vehicle has traveled over a predetermined distance from the first time point; and start performing the driving support including changing a traveling direction of the own vehicle when a direction indicator of the own vehicle indicates the first direction under the state in which the start of the driving support is possible.

2. The driving support device according to claim 1, wherein, when a distance between the own vehicle and the intersection is equal to or shorter than a threshold value at the second time point, the control device is configured to hold the state in which the start of the driving support is possible until one of: a third time point that is one of a time point when a predetermined time has elapsed from the second time point or a time point when the own vehicle has traveled over a predetermined distance from the second time point; or a fourth time point that is a time point when the own vehicle passes the intersection from the second time point.

3. The driving support device according to claim 1, wherein the control device is configured to hold the state in which the start of the driving support is possible regardless of whether the adjacent traveling lane is absent or present in a situation in which the traveling lane on which the own vehicle is traveling is a dedicated lane that permits travel toward only a specified direction including the first direction.

4. The driving support device according to claim 1, wherein the driving support includes deceleration support of decelerating the own vehicle by performing braking control of the own vehicle, and wherein the control device is configured to start the deceleration support when a speed of the own vehicle is higher than a predetermined target value.

5. The driving support device according to claim 1, wherein the vehicle is an autonomous vehicle.

\* \* \* \* \*